United States Patent Office 3,111,491
Patented Nov. 19, 1963

3,111,491
ELECTRICALLY CONDUCTIVE OIL-BASE DRILLING FLUIDS
Earle R. Atkins, Jr., and Paul W. Fischer, Whittier, and Paul G. Nahin, Brea, Calif., assignors to Union Oil Company of California, Los Angeles, Calif., a corporation of California
No Drawing. Filed May 31, 1960, Ser. No. 32,592
14 Claims. (Cl. 252—8.5)

This invention relates to oil-base drilling fluids, and in particular concerns oil-base drilling fluids which are electrically conductive. It further relates to means for rendering non-conductive oil-base drilling fluids electrically conductive, and to means for conducting electric well logging operations.

In drilling oil or gas wells by means of rotary drilling tools, a hollow drill pipe having a bit attached to its lower end is extended downwardly through the well bore and is rotated while the bit is pressed against the working face in the formation at the bottom of the hole. The action of the rotating bit grinds away the formation as the drilling progresses. During the drilling a fluid body known as a drilling fluid is continuously circulated down through the drill stem, through the bit and against the working face of the hole, and then back up to the surface through the annular space between the drill stem and the walls of the bore hole. The drilling fluid serves a number of purposes, among which are cooling and lubricating the drill bit, suspending and removing cuttings from the bore hole, preventing the flow of liquids from the formations traversed by the bore into the same by exerting a hydrostatic pressure on such formations, and fulfilling other purposes.

In locations where the underground formations traversed and/or penetrated by the bore contain materials such as hydratable clays which swell and/or disintegrate in the presence of water, it has become customary to employ drilling fluids which are relatively free of water, e.g., fluids which contain less than about 10 percent of water, in order to preclude or minimize the introduction of water into the bore by means of the drilling fluid. Such drilling fluids are termed "oil-base" fluids since they almost invariably comprise a mineral oil having dispersed or suspended therein minor proportions of various agents adapted to impart the requisite physical properties to the base oil. Among the most important of such agents are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents escape of the drilling fluid into permeable formations; and dispersing agents, which serve to maintain solid components of the fluid uniformly dispersed therein.

Among the various methods for investigating and determining the nature of the subsurface formations traversed by a well bore, i.e., well logging, those involving the measurement of one or more of the electrical characteristics of such formations enjoy wide application. Most of such methods require that the bore hole be filled with a liquid capable of conducting relatively low voltage electric currents, and it is hence highly desirable that the drilling fluid employed in drilling the well be adapted for such use, i.e., the drilling fluid should have relatively good electrical conductivity. In general, however, oil-base drilling fluids are not sufficiently conductive to adapt them for use during electric logging operations, and this deficiency has greatly restricted their general applicability despite their other highly desirable properties and characteristics. Typically, oil-base drilling fluids have electrical resistivities of the order of $1 \times 10^8$ ohm-cms., which is far too high to permit their use in electric logging operations where it is usually desirable that the bore hole fluid have a resistivity not greater than about $50 \times 10^3$ ohms-cms. and preferably below about $5 \times 10^3$ ohm-cms.

Various methods by which electric resistivities of oil base fluids can be reduced to a suitable low value to electric logging operations are set forth in the following U.S. Patents to Paul W. Fischer: 2,573,961; 2,696,468; 2,717,239; 2,721,841 and 2,739,120. In general, the methods set forth in these patents comprise mixing a suitable electrolyte into the oil base mud and dispersing it therein. To aid in the dispersion, a suitable dispersing agent, e.g., a surface active agent, dispersing agent, non-ionic wetting agent, etc., is added to the fluid. Alkali metal silicates, a type of suitable electrolyte, was found to be unique in the respect that low resistivities were obtained without the use of a dispersing agent. These materials, i.e., the electrolyte and dispersing agent, are herein referred to as conductive additives. In the use of said conductive additives set forth in the aforecited patents, it was found that in many instances, the normal water content of the oil-base fluid is sufficient to dissolve the added electrolyte, but in other cases a small amount of water must be added for this purpose. In order to retain the desirable general characteristics of oil-base drilling fluids, however, the water content should be maintained below about 10, preferably between about 4 and about 8, percent by weight of the entire composition.

It was found that when a voltage was applied to oil base fluids containing the aforementioned conductive additives, an initial high resistivity was obtained which gradually decreased to a lower ultimate resistivity. The time required to reach the ultimate resistivity varied somewhat depending on the magnitude of the applied voltage, identity and nature of oil base fluid and the amount and identity of the conductive additives. In general, this delay was between about 20 to 60 seconds.

We have now found that the time required for the oil base fluid containing one of the aforementioned conductive additives to arrive at its ultimate resistivity can be substantially eliminated by the addition thereto of a slight amount of radioactive materials. The initial and ultimate resistivities of the oil base fluid are also greatly reduced; the resistivities of the fluid containing the radioactive material being only a fraction of those obtained without the material.

The radioactive material employed in accordance with the invention is any suitable naturally or artificially radioactive material such as uranium, iodine 131, bromine 82, selenium 75, cesium 134, cerium 144, praseodymium 144, indium 192, antimony 124, cobalt 60, strontium 89, scandium 46, yttrium 90, sodium 22, as well as the various radioactive fission product wastes separated during the reprocessing of spent fuel from nuclear reactors. In general, any convenient form of the material can be used, e.g., water or oil soluble inorganic or organic salts such as uranium nitrate, uranium oleate, radioactive iodobenzene, potassium iodide, sodium salts, cesium chloride, cobalt chloride, etc. can be added and dissolved in either the oil or water phases of the fluid. The radioactive elements can also be used in powdered or colloidal form and dispersed through the fluid with various dispersing agents. If desired, radioactive cations can be ion exchanged onto clay and the clay incorporated into the fluid.

The amount of radioactive material depends on its energy of radiation and subsequent ability to produce ionization in the drilling fluid, in general, materials having radiation energies between about 0.1 to 5 million electron volts are employed in concentrations between about 1 and about 1000 microcuries per gallon, preferably between about 100 and 500 microcuries per gallon. In general, this requires between about 0.01 and 1.0 weight percent of radioactive material in the final drilling fluid the amount used dependent on the radiation energy of the particular material.

As previously mentioned, the radioactive material is incorporated into an oil base drilling fluid such as described in the cited patents to Paul W. Fischer. These drilling fluids contain a conductive additive composed of an electrolyte and dispersing agent. As set forth in the cited patents, suitable electrolytes are water-soluble ionizable metallic compounds which are for the most part water-soluble salts of the alkali- and alkaline-earth metals and alkali-metal hydroxides. In accordance with customary nomenclature the ammonium radical is included within the term "alkali-metal." Water-soluble salts of the heavy metals are not inoperable insofar as initially imparting electrical conductivity to the fluid is concerned, but because of the tendency of such salts to hydrolyze in aqueous solution to form insoluble hydroxides, their effect on electrical conductivity is not usually permanent. Specific examples of the class of water-soluble ionizable metal compounds include the hydroxides of sodium, potassium and lithium, sodium chloride, barium chloride, potassium iodide, ammonium chloride, calcium bromide, magnesium chloride, calcium nitrate, barium nitrate, magnesium nitrate, sodium sulfate, potassium sulfate, magnesium sulfate, sodium carbonate, lithium carbonate, potassium bicarbonate, sodium silicate, potassium silicate, sodium phosphate, ammonium phosphate, sodium polyphosphate, potassium bisulfate, sodium sulfite, sodium acetate, potassium arsenate, sodium borate, potassium dichromate, sodium cyanide, calcium nitrite, ammonium hydrogen phosphate, sodium thiosulfate, sodium chromate, sodium thiosulfate, sodium molybdate, potassium phosphite, sodium manganate, etc. Mixtures of such compounds may likewise be employed. In general, best results are obtained by employing compounds which dissociate in water to form alkali solutions, i.e., hydroxides and salts of strong bases and weak acids. The alkali-metal hydroxides, silicates, and phosphates are particularly preferred.

As set forth in the cited patent, it is necessary to add a dispersing agent to the fluid to obtain lowered resistivities. Suitable dispersing agent can be sulfated or sulfonated organic compounds such as those disclosed and claimed in the aforecited patent, 2,696,468. In general, these agents contain either the sulfate groups, $ROSO_3M$ or the sulfonate group $RSO_3M$, wherein R represents an organic radical and M represents hydrogen or an alkali metal. The following types of compounds are included:

Sulfated oils, such as those formed by the reaction under mild conditions of an animal or vegetable oil with sulfuric acid, e.g., Aquasol AR, Hartex Oil K–40, Monopole Oil, Nopco 1935, 1471, etc.;

Sulfated alcohols such as sulfuric acid esters of long chain fatty alcohols and alkali metal salts thereof, e.g. Duponol ES and ME, Artic Syntex M, Aurinol, Gardinol, Tergitol, Penetrant 08, etc.;

Aliphatic and naphthenic sulfonates and alkali metal salts thereof, e.g., Aerosol OT and MA, Artic Syntex A and B, Igepon A and T, Pentronate, Saponate MP–189, Esterol, etc.;

Aromatic sulfonates and alkali metal salts thereof, e.g., Aerosol OS, Alkanol B and S, Darvan, Daxad, Nacconol NRSF, Neomerpin, Santomerse 1, Oronite, etc.

Other dispersing agent can be employed in lieu of the aforementioned, e.g., in U.S. Patent 2,717,239, alkali metal salts of carboxymethyl cellulose obtained by neutralization of carboxymethyl cellulose acid with an appropriate alkali are employed. A commercially available product is sold under the name "Carbose."

Still other suitable dispersing agent are set forth in U.S. Patent 2,739,120, which are the non-ionic surface active agents. This art recognized class of compounds possesses a non-ionic property because the polar and non-polar portions of the molecules are so balanced that they are substantially incapable of ionization. Members of this group are: partial esters of polyhydric alcohols with long chain carboxylic acid, e.g., Artacel, Span, Emcal, Tegin, etc.; esters of hydroxyalkyl ethers of polyhydric alcohols with long chain carboxylic acids, e.g., Emcol DL, Triton, Tween, etc.; and polyalkylene ether alcohols.

A fourth type of dispersing agent is the alkali metal soap of humic acid such as disclosed in U.S. Patent 2,721,841. The term humic acid is employed in reference to the alkali-metal soluble materials formed by the natural decomposition of humus or lignocellulose. The alkali metal soaps thereof are obtained by slowly stirring humic acid into an aqueous solution of the desired base, e.g., sodium or potassium hydroxide, sodium carbonate, etc.

The proportions in which the electrolyte and the dispersing agent are incorporated in the drilling fluid are to a certain extent interdependent, i.e., with increasing amounts of the electrolyte the amount of dispersing agent may be decreased, and vice versa. Also, certain particular electrolytes require the presence of more of the dispersing agent than others and certain particular dispersants are more effective in a given amount than others. In general, however, the water-soluble metal salt or alkali-metal hydroxide is provided in an amount representing between about 0.01 and about 5 percent, preferably between about 0.1 and about 2 percent, by weight of the entire composition, and the dispersing agent is employed in an amount representing between about 0.1 and about 8 percent, preferably between about 0.4 and about 4 percent, by weight of the entire composition.

As previously stated, it is necessary that the drilling fluid contain sufficient water to dissolve the water-soluble metal salt or hydroxide so that the latter becomes dispersed in the fluid in the form of a relatively dilute solution. In many instances the drilling fluid will normally contain sufficient water for this purpose, in which case no water need be added along with the metal salt or hydroxide. In some instances, however, it will be necessary to add a small amount of water. In general, it is desirable that the drilling fluid contain at least about 3 percent, preferably at least about 5 percent by weight of water. The upper limit on the water content of the fluid is established at about 10 percent by weight since those fluids which contain substantial amounts of water lose the desirable characteristics of oil-base drilling fluids in general, and are more properly classifiable as emulsion-base fluids.

The use of a radioactive material in combination with the conductive additives composed of a water-soluble metal salt or alkali-metal hydroxide and a dispersing agent is applicable to oil-base drilling fluids in general, regardless of their exact formulation. In general, all oil-base drilling fluids essentially comprise a mineral oil dispersion of solids and a dispersing agent which serves to maintain the solids more or less stably dispersed in the oil. When a hydratable clay is included as a wall-building agent the fluid usually also contains a small quantity of water. Almost invariably the base oil is a mineral oil, and may be crude oil, a distillate, or a residual fraction. Very often blends of distillate and residual fractions are employed, e.g., a blend of a light distillate such as kerosene or diesel fuel and a light residual fraction such as furnace oil or a light fuel oil. The dispersed solids may serve solely as a weighting agent, in which case they usually take the form of finely-divided inert metallic compounds such as lead dust, barytes, iron oxide, calcined clay, whiting and the like, or they may serve as wall-building agents to coat or plaster the walls of the bore with an impermeable layer which prevents escape of the drilling fluid into permeable formations traversed by the bore. Such wall-building agent usually comprises a hydratable clay such as bentonite, in which case a small amount of water is included in the fluid for the purpose of effecting hydration of the clay. Asphalt is also employed as a wall-building agent. In many instances the dispersed solids may comprise both a weighting agent and a wall-building agent. A wide variety of materials may be employed as dispersing or suspending agents to maintain the solids uniformly dispersed in the base oil. For the most part, however, the dispersing agent will comprise a metal soap of a fatty, resin or naphthenic acid. In some instances such soaps are formed in situ by incorporating into the fluid a soap-forming acid, such as tall oil, rosin, oleic acid, a sulfonic acid, linoleic acid, linseed acids, and the like and a basic inorganic compound such as sodium hyduroxide, lime, or sodium silicate. In other cases the soap may be formed in situ by incorporating an alkali-metal soap and an alkaline-earth metal base into the fluid, whereby a metathesis reaction occurs to form the corresponding alkaline-earth metal soap. Soap mixtures, including mixtures of water-dispersible and oil-dispersible soaps may also be employed. In addition to the soap-type dispersing agents, such materials as lampblack and diatomaceous earth have been employed for the same purpose.

While the principle of the invention is applicable broadly to all types of oil-base drilling fluids, it is particularly applicable to the soap-stabilized fluids of the type described in U.S. Patent 2,542,020. Such fluids are prepared by dispersing small amounts each of a hydratable clay, an alkaline-earth metal base, and an alkali-metal soap of a heat-treated rosin in a suitable base oil. A partial metathesis reaction occurs between the rosin soap and the alkaline-earth metal base whereby there is obtained a mixture of the corresponding alkaline-earth metal rosin soap and unreacted alkali metal rosin soap. The alkali-metal rosin soap employed in preparing this type of drilling fluid is obtained by reacting an alkali-metal alkali, e.g., sodium or potassium hydroxide, with heat-treated wood or gum rosin in such a manner that the reaction is only partially complete and the saponified product contains from about 1 to about 15 percent of free unsaponified resin acids.

The heat-treatment of rosin, whereby the resin acids thereof are isomerized and/or otherwise modified, is well known in the naval stores art, and may be effected in various ways to obtain modified rosin products which vary somewhat in their physical and chemical properties depending upon the nature and extent of the heat-treatment. Thus, any of the various color grades of refined wood or gum rosin may be heated under non-oxidizing conditions at temperatures between about 250° C. and about 350° C. for a length of time sufficient to raise the specific rotation of the rosin from its original negative value to a value between about +5° and about +15°. The resulting rosin product closely resembles the original rosin in appearance, ease of saponification, etc., but is considerably altered chemically as evidenced by its increased specific rotation, increased dehydroabietic acid content, lower iodine number, etc. By carrying out the heat-treatment at somewhat higher temperatures and/or over longer periods of time, the specific rotation may be raised further, e.g. to +25° or even higher, and the degree of olefinic unsaturation further decreased. Also, under such conditions decarboxylation takes place with the formation of unsaponifiable bodies which are usually referred to as rosin oils. The heat-treatment of rosin to secure the desired modification of the resin acids as indicated by increase in specific rotation to a value above about +5° may also be effected in the presence of catalysts at relatively low temperatures as described in U.S. Patent 2,154,629. The catalysts employed are of the hydrogenation type, e.g., metallic platinum or palladium, although the treatment is carried out in the absence of added hydrogen. The reaction which takes place is termed "disproportionation" since it involves the simultaneous hydrogenation and dehydrogenation of abietic-type acids with the consequent formation of dihydroabietic and dehydroabietic acids and their analogues, and the resulting product is referred to as "disproportionated rosin." Similarly, the product obtained by heat-treating rosin under conditions sufficiently drastic that carboxyl groups are removed from the rosin acids is termed "decarboxylated rosin," and the product obtained by heat-treating rosin under less drastic conditions so that the change effected is substantially only one of molecular rearrangement is referred to as "isomerized rosin." All of these modified rosin products are characterized by having been prepared by heat-treating rosin under conditions of time and temperature, and in the presence or absence of a hydrogenation catalyst but in the absence of added hydrogen, sufficient to raise the specific rotation of the rosin to a value above about +5°.

Any of the above described modified rosin products may be used to obtain the saponification products employed in preparing the preferred drilling fluid compositions of the present invention. Procedure for carrying out the saponification reaction is well known in the art, and in general consists merely of adding the modified rosin in the solid or molten state to a hot aqueous solution of the desired alkali-metal alkali and thereafter heating the mixture until the reaction is complete and the product contains the desired amount of water. The amount of alkali employed is somewhat less than that required for the complete saponification of the resin acids in order that the saponification product may contain the requisite amount of free unsaponified resin acids. The concentration of the aqueous alkali is usually so adjusted that the product obtained takes the form of a viscous liquid or thick paste containing 60–85 percent solids. The physical form of the product also depends somewhat upon the type of modified rosin employed. The saponification product obtained from decarboxylated wood rosin containing a substantial amount of rosin oils, for example, is a relatively fluid liquid even though it may contain only 5–10 percent of water.

While any of the alkali-metal alkali saponification products of rosin which has been heat-treated to raise its specific rotation to a value above about +5° may be employed in preparing the oil-base drilling fluids, we have found that superior results, particularly with respect to the fluid loss value of the drilling fluid, are attained by employing either of two specific products of this type. The first of such preferred saponification products is an alkali-metal alkali saponification product of rosin which has been heat-treated at temperatures between about 250° C. and about 350° C. in the absence of a catalyst to such an extent that it contains only about 50–60 percent of free resin acids, 30–40 percent of unsaponifiable oils, and small amounts of phenolic materials, water, and products of unknown constitution. A particularly preferred product of this type is the potassium hydroxide saponification product of such heat-treated rosin containing about 45–55 percent potassium resin acid soaps, about 30–35 percent unsaponifiable materials, about 5–10 percent free resin acids, and about 5–10 percent water. The second of the preferred class of saponification products is the product obtained by heating rosin at a temperature of about 225°–300° C. for about 15–60 minutes in contact with a hydrogenation catalyst but in the absence of added hydrogen distilling the resulting product and collecting a fraction distilling at about 210°–275° C. under about 5–10 mm. pressure, and thereafter saponifying such fraction with aqueous sodium hydroxide in the known manner. Such product is available commercially under the trade name "Dresinate 731." Mixtures of these two types of saponified heat-treated rosin products may also be employed.

The proportions in which the components of this type of drilling fluid are employed may be varied between certain limits depending on the identity of such components and the specific properties desired in the composition. Ordinarily, however, the saponified heat-treated rosin product is employed in an amount representing between 1 and about 10, preferably between about 4 and about 8, percent by weight of the entire composition. The alkaline-earth metal base, which is preferably calcium hydroxide or calcium oxide, is employed in an amount corresponding approximately to that chemically equivalent to the saponified rosin product. When the latter is one of the preferred products hereinbefore described and the alkaline-earth metal base is calcium oxide or hydroxide, the saponification product is provided in the above-mentioned amount and the base is employed in an amount representing between about 0.1 and about 5, preferably between about 0.4 and about 2, percent by weight of the entire composition. The hydratable clay is employed in an amount representing between about 0.1 and about 5, preferably between about 0.4 and about 1.2, percent by weight of the entire composition, and the water is provided in an amount representing between about 0.2 and about 10, preferably between about 1 and about 5, percent by weight of the entire composition. These proportions of water include any water which may be contained in the saponified rosin product and/or other components, and accordingly the amount of water actually added during preperation of the composition will be adjusted according to the water content of the other components so that the final composition will contain water in the above-mentioned proportions.

In determining the electrical resistivity of the drilling fluids provided by the invention, an electrode assembly comprising two 1-inch square nickel plates spaced about one inch apart is immersed in a sample of the fluid being tested, and the voltage which must be applied across the electrodes to obtain a predetermined current flow through the fluid (usually 400 milliamperes) is ascertained. By calibrating the electrode assembly against a liquid of known resistivity, the resistivity of the fluid sample being tested may be determined from such voltage reading. It has been found, however, that many drilling fluids undergo a dielectric breakdown during such testing procedure. Thus, when the fluid is first subjected to the test the voltage cross the electrodes may be increased to a relatively high value before substantial current flows. As soon as the current starts to flow, however, the voltage may be substantially reduced without the flow of current falling below the aforesaid predetermined value. Accordingly, in making the resistivity determination, the electrode assembly is immersed in the fluid and the voltage applied to the electrode plates is gradually raised until the predetermined flow of current is obtained. A so-called "initial resistivity" value is determined from the applied voltage. The voltage is then gradually reduced, and the minimum voltage required to maintain the predetermined current flow is ascertained, and a so-called "ultimate resistivity" value is determined from such minimum voltage reading.

The latter characteristic, i.e., the dielectric breakdown of the fluid particularly concerns our invention. During normal logging operations it is desirable to have a relatively fast rate of travel of the electrodes through the well bore to reduce the time required for the logging operation and the associated stand by time of a drilling rig. When using oil base fluids containing only the conductive additives, high rates of travel; up to 8–15 feet per second; of the electrode assembly are not possible because of the time lag required for the fluid to reach its ultimate resistivity. We have found, however, that the addition of the aforementioned radioactive materials to this fluid substantially eliminates this time lag and thus permits higher rates of travel of the electrodes. In addition to the elimination of time lag, the presence of the radioactive material substantially reduces both the initial and ultimate resistivity of the fluid.

The following examples will illustrate a number of ways in which the principle of the invention may be applied, but are not to be construed as limiting the same.

*Example I*

The following concentrate composition is prepared:

| | Parts by weight |
|---|---|
| Diesel fuel | 2800 |
| Saponified decarboxylated rosin | 1400 |
| Saponified disproportionated rosin | 1400 |
| Bentonite | 840 |
| Water | 560 |

The diesel fuel is a light domestic diesel oil having an API gravity of about 31°, a viscosity of about 40 SUS at 100° F. and a boiling range of about 400°–720° F. The saponified decarboxylated rosin contains 45–55 percent of potassium resin acid soaps, 30–55 percent of unsaponifiable rosin oils, 5–10 percent of free resin acids and 5–10 percent of water. The saponified disproportionated rosin is the hereinabove described "Dresinate 731."

This concentrate composition is then partially diluted with a further quantity of the diesel fuel in a ratio of 3 gallons of diesel fuel per 2 gallons of concentrate, and the partially diluted concentrate is then further diluted with fuel oil in a ratio of 17 gallons of fuel oil per 5 gallons of the partially diluted concentrate. Approximately 740 parts by weight of calcium oxide are then stirred into the completely diluted concentrate. The fuel oil is a light domestic fuel oil having an API gravity of about 14.5°, a viscosity of about 36 SSF at 127° F. and a flash point of 170° F.

The finished drilling fluid has the following approximate composition:

| | Percent by weight |
|---|---|
| Domestic diesel fuel | 15.7 |
| Light domestic fuel oil | 77.7 |
| Saponified decarboxylated rosin | 1.9 |
| Saponified disproportionated rosin | 1.9 |
| Calcium oxide | 0.9 |
| Water | 0.8 |
| Bentonite | 1.1 |
| | 100.0 |

The following table presents illustrative examples of compositions of our invention comprising the aforedescribed finished drilling fluid, a conductive additive and a radioactive material:

| Radioactive Material | Amount[1] | Conductive Additive | | | | |
|---|---|---|---|---|---|---|
| | | Electrolyte | Amount[1] | Water[1] | Dispersant | Amount[1] |
| Uranium nitrate | 0.03 | Sodium chloride | 0.6 | 6.7 | "Oronite," sodium alkyl aryl sulfonate. | 3.6 |
| Cobalt chloride | 0.05 | Sodium hydroxide | 0.6 | 6.7 | ----do---- | 3.6 |
| Cerium chloride | 0.09 | Sodium silicate | 0.6 | 6.8 | ----do---- | 3.6 |
| Sodium chloride | 0.09 | Trisodium phosphate | 0.6 | 6.2 | Triton X-100 | 2.4 |
| Uranium oleate | 0.04 | Sodium carbonate | 0.9 | 7.4 | ----do---- | 2.3 |
| Iodobenzene | 0.07 | Sodium bicarbonate | 0.6 | 6.1 | Sodium carboxymethyl cellulose | 2.4 |
| Uranium nitrate | 0.03 | {Trisodium phosphate / Calcium chloride} | 0.9 / 0.07 | 6.0 | Sodium salt of humic acid | 2.4 |

[1] Expressed as weight percentage of final drilling fluid composition.

The presence of the radioactive material in the above compositions substantially eliminates the time lag to reach ultimate resistivity, and reduces initial and final resistivity several fold. In all examples, the final resistivity of the fluids was below $10 \times 10^3$ ohm cms.

*Example II*

A drilling fluid is prepared composed of the aforedescribed finished drilling fluid, a conductive additive and 0.03 percent of uranium nitrate. The composition is:

| Component— | Weight percent |
|---|---|
| Finished drilling fluid | 87 |
| Conductive additive | |
| Electrolyte: | |
|   Sodium silicate | 0.08 |
|   Sodium hydroxide | 0.07 |
|   Trisodium phosphate | 1.0 |
| Water | 5.2 |
| Dispersant: | |
|   "Oronite" | 2.5 |
|   Humic acid | 2.0 |
| Isopropyl alcohol [1] | 0.09 |
| Uranium nitrate | 0.03 |

[1] A water miscible organic solvent such as isopropyl alcohol can optionally be included to promote solubility of the dispersant in water.

The resistivities of this composition with and without the uranium nitrate is as follows:

| | Ohm cms. $\times 10^3$ | |
|---|---|---|
| | Initial | Ultimate |
| With Uranium Nitrate | 0.02 | 0.02 |
| Without Uranium Nitrate | 3 | 1 |

The ultimate resistivity of the fluid is achieved substantially immediately with uranium nitrate added; without uranium nitrate, about 20 to 25 seconds are required to reach ultimate resistivity.

*Example III*

The following exemplify various "conductivity additive" compositions which is added to the oil-base fluid in an amount representing 10 weight percent within the scope of the invention.

| Composition A: | Parts |
|---|---|
| Sodium humate | 35 |
| Sodium hydroxide | 3 |
| Sodium silicate | 10 |
| Trisodium phosphate | 10 |
| Water | 50 |
| Uranium nitrate | 0.3 |

| Composition B: | |
|---|---|
| Sodium silicate | 8 |
| Sodium hydroxide | 7 |
| Isopropyl alcohol | 9 |
| "Oronite" | 25 |
| Water | 52 |
| Radioactive cobalt nitrate | 0.3 |

Various other of the aforementioned additives can also be used in combination with any of the aforementioned, e.g., 1 to 20 parts of humic acid, an alkali carboxymethyl cellulose salt or non-ionic surface active agent can be added to the above compositions if desired.

As will be apparent to those skilled in the art, many variations in the composition of the drilling fluid and/or the conductivity additives may be made without departing from the scope of the invention. The essence of the invention lies in adding a radioactive material to an oil base drilling fluid containing a conductive additive so as to reduce or eliminate the time lag for the fluid to reach its ultimate resistivity and to reduce the initial and final resistivity of the fluid.

The conductive drilling fluids provided by the invention may be employed in any of the various well logging methods which require that one or more electrodes be positioned within a well bore filled with a conductive fluid. Certain of such methods comprise a determination of the electrical resistivity of the earth formations traversed by the bore. Others comprise measuring the so-called "self-potential" of such formation. Regardless of the exact nature of the logging method, however, the herein described drilling fluids are well adapted to use as the conductive fluid with which the bore is filled and within which an electrode is submerged.

Other modes of applying the principle of our invention may be employed instead of those explained, change being made as regards the methods or materials employed provided the compositions stated by any of the following claims, or the equivalent of such stated compositions, be obtained.

We claim:

1. An oil base drilling fluid consisting essentially of the following: a mineral oil, suspended solids, sufficient of a first dispersing agent to maintain said solids dispersed in said oil, between about 3 and about 10 percent by weight of water, between about 0.01 and about 5 percent by weight of electrolyte selected from the class consisting of water-soluble metal salts and alkali-metal hydroxides, between about 0.1 and about 8 percent by weight of a second dispersing agent to maintain said electrolyte dispersed in said drilling fluid and sufficient radioactive material to provide between about 1 and 1000 microcuries per gallon.

2. An oil-base drilling fluid according to claim 1 wherein said first dispersing agent is a metal soap.

3. An oil-base drilling fluid according to claim 1 wherein said first dispersing agent comprises a mixture of water-dispersible and oil-dispersible resin soaps.

4. An oil-base drilling fluid according to claim 1 wherein said second dispersing agent is a non-ionic surface active agent.

5. An oil-base drilling fluid according to claim 1 wherein said second dispersing agent is an alkali metal salt of humic acid.

6. An oil-base drilling fluid according to claim 1 wherein said second dispersing agent is an alkali metal salt of carboxymethyl cellulose.

7. An oil-base drilling fluid according to claim 1 wherein said second dispersing agent is selected from the group consisting of sulfated oils, sulfated alcohols, aliphatic and naphthenic sulfonates, aromatic sulfonates, and the alkali-metal salts thereof.

8. A conductivity additive composition for oil-base drilling fluids consisting essentially of the following ingredients in parts by weight: 100 parts of water, between about 10 and about 40 parts of an alkali metal hydroxide and a water-soluble salt of a strong base and a weak acid, between about 20 and about 80 parts of a dispersing agent and between about 0.1 and 10.0 parts of a radioactive material.

9. A conductivity additive according to claim 8 wherein said dispersing agent is a non-ionic surface active agent.

10. A conductivity additive according to claim 8 wherein said dispersing agent is an alkali metal salt of humic acid.

11. A conductivity additive according to claim 8 wherein said dispersing agent is an alkali metal salt of carboxymethyl cellulose.

12. A conductivity additive according to claim 8 wherein said dispersing agent is selected from the group consisting of sulfated oils, sulfated alcohols, aliphatic and naphthenic sulfonates, aromatic sulfonates and the alkali-metal salts thereof.

13. An oil-base drilling fluid consisting essentially of a mineral oil, suspended solids, sufficient of a first dispersing agent to maintain said solids dispersed in said oil, between about 3 and about 10 percent by weight of an electrolyte selected from the class consisting of water-soluble metal salts and alkali-metal hydroxides, between about 0.1 and about 8 percent by weight of a second dispersing agent to maintain said electrolyte dispersed in said drilling fluid, and between about 0.01 and 1.0 percent by weight of a radioactive material.

14. In a well logging method wherein at least one electrode is positioned within a well bore filled with an electrically conductive fluid, the improvement which consists in employing as said fluid the conductive oil-base drilling fluid defined by claim 1.

References Cited in the file of this patent

UNITED STATES PATENTS

| | | |
|---|---|---|
| 2,339,129 | Albertson | Jan. 11, 1944 |
| 2,588,210 | Crisman et al. | Mar. 4, 1952 |
| 2,659,046 | Arps | Nov. 10, 1953 |
| 2,696,468 | Fischer | Dec. 7, 1954 |
| 2,721,841 | Fischer | Oct. 25, 1955 |